United States Patent [19]
Poklemba

[11] Patent Number: 5,216,696
[45] Date of Patent: Jun. 1, 1993

[54] PROGRAMMABLE NOISE BANDWIDTH REDUCTION BY MEANS OF DIGITAL AVERAGING

[75] Inventor: John J. Poklemba, Frederick, Md.

[73] Assignee: Comsat Laboratories, Clarksburg, Md.

[21] Appl. No.: 730,426

[22] Filed: Jul. 16, 1991

Related U.S. Application Data

[63] Continuation-in-part of Ser. No. 457,027, Dec. 22, 1989, Pat. No. 5,052,027.

[51] Int. Cl.$^5$ .............................................. H04L 7/00
[52] U.S. Cl. ...................................... 375/99; 375/103; 375/106
[58] Field of Search ................. 375/99, 102, 103, 104, 375/106; 364/724.01, 724.1, 734; 455/306, 312, 303, 307, 295, 296; 328/164

[56] References Cited

U.S. PATENT DOCUMENTS

| | | | |
|---|---|---|---|
| 4,563,637 | 1/1986 | De Bortol et al. | 375/118 |
| 4,583,184 | 4/1986 | Murase | 358/112 |
| 4,714,929 | 12/1987 | Davidson | 340/976 |
| 4,727,504 | 2/1988 | Van Broekhoven | 364/720.01 |
| 4,958,361 | 9/1990 | Rosen et al. | 375/103 |
| 5,070,516 | 12/1991 | Le Comte | 375/103 |

Primary Examiner—Stephen Chin
Attorney, Agent, or Firm—Sughrue, Mion, Zinn, Macpeak & Seas

[57] ABSTRACT

Predetection noise bandwidth reduction is effected by a pre-averager capable of digitally averaging the samples of an input data signal over two or more symbols, the averaging interval being defined by the input sampling rate divided by the output sampling rate. As the averaged sample is clocked to a suitable detector at a much slower rate than the input signal sampling rate the noise bandwidth at the input to the detector is reduced, the input to the detector having an improved signal to noise ratio as a result of the averaging process, and the rate at which such subsequent processing must operate is correspondingly reduced. The pre-averager forms a data filter having an output sampling rate of one sample per symbol of received data. More specifically, selected ones of a plurality of samples accumulated over two or more symbol intervals are output in response to clock signals at a rate of one sample per symbol interval. The pre-averager includes circuitry for weighting digitized signal samples using stored finite impulse response (FIR) filter coefficients. A method according to the present invention is also disclosed.

11 Claims, 9 Drawing Sheets

PROGRAMMABLE NOISE BANDWIDTH REDUCTION BY MEANS OF DIGITAL AVERAGING

The U.S. Government has a paid-up license in this invention and the right in limited circumstances to require the patent owner to license others on reasonable terms as provided by the terms of contract No. NAS3-25715 awarded by the National Aeronautics and Space Administration (NASA).

FIELD OF THE INVENTION

This is a continuation-in-part of application Ser. No. 07/457,027, filed Dec. 22, 1989, now U.S. Pat. No. 5,052,027.

The invention is in the field of signal demodulation and has application in information transmission systems where predemodulation, that is, predetection, noise bandwidth reduction is advantageous to increase the signal-to-noise (S/N) ratio prior to signal detection. More specifically, the present invention is directed towards a variable-rate data filter for digital data transmission having optimum adjacent channel rejection characteristics.

BACKGROUND OF THE INVENTION

Modulated signals, carrying information such as video, data, music and speech are generally contaminated by noise. Efficient demodulation requires distinguishing the information from the noise.

The demodulation process includes several steps. The receiver may receive, at its antenna, an information signal modulated on a radio frequency (RF) carrier. The signal may then undergo frequency conversion to the intermediate frequency (IF) band. The information signal, at baseband, is recovered from the IF signal by a suitable detector. Considering, for example, a conventional receiver in a variable rate digital data transmission system, the IF signal, produced from a received RF signal by subjecting the RF signal to a mixing or filtering process, is subsequently applied to a data detector for recovering, at baseband, the information content of the input signal.

The system must be responsive to a variable rate signal, thus the IF bandwidth must be broad enough to process the highest expected data rate, although at any point in time the receiver may be detecting a lower rate and thus narrower band signal. As the noise bandwidth is not limited to the frequency spectrum, that is, bandwidth, of the received signals, the bandwidth of the receiver's front end, that is, prior to detection, must be scaled with the received signalling rate to prevent noise overload, signal suppression, and distortion in subsequent digital processing stages. To effect this scaling it is conventional to use some type of filter switching mechanism limiting the IF bandwidth based on the receive-signalling rate.

A conventional filter switching arrangement for limiting the noise bandwidth at a receiver front end is illustrated in FIG. 1. This arrangement may be used in a receiver of a digital data transmission system to select a bandwidth at IF sufficient to pass data signals transmitted at a selected one of several data rates, while suppressing noise outside that bandwidth.

The FIG. 1 arrangement includes an input terminal 6 receiving the incoming modulated signal and noise at IF. The input terminal 6 is connected to a commutator 4 of a rotary switch 2. The switch 2 has a number of fixed contacts $8_1$–$8_n$ each selectively connected to the commutator 4 through rotation of the commutator. Each fixed contact $8_1$–$8_n$ is electrically connected to a respective IF filter $10_1$–$10_n$. The center frequencies $F_1$–$F_n$ and bandwidths $BW_1$–$BW_n$ of the IF filters $10_1$–$10_n$ are selected on the basis of the data rates the receiver is designed to accept. The outputs from the IF filters are input to a power combiner 12. The output from the power combiner is an IF signal whose bandwidth is scaled to the signalling rate of the received signal, that is, somewhat greater than, but proportional to, the bandwidth of the received data or symbol rate, thereby reducing the noise bandwidth prior to data detection in a detector 14. The reduced noise bandwidth prevents noise overload, signal suppression and distortion in the latter processing stages of the detector 14.

More specifically, in operation of the conventional arrangement of FIG. 1, an RF signal, modulated by a data signal at the selected symbol rate, is converted to IF by conventional mixing or filtering and then applied to input terminal 6. One of the parallel sets of filter paths is selected by rotating commutator 4 based on the symbol rate of the data signal modulating the IF signal. The selected one of the IF filters $10_1$–$10_n$ limits the bandwidth of the IF signal prior to detection, thereby reducing the noise bandwidth which initially extends over the entire IF spectrum. This conventional arrangement suffers from several disadvantages. For example, it is expensive and cumbersome to implement, and it produces gain and phase variations from one path to another as well as from one unit to another.

If the filter responses are relatively simple, a single filter implementation with switched elements might be used instead of the plural paths of the filters. However, even in this case, the disadvantages stated above exist.

Boxcar filtering is another technique which may be used to reduce predetection noise. Boxcar filtering involves averaging the incoming signal, with noise reduction the expected result since noise is theoretically random. Over time many random signals have substantially equal positive and negative components, and thus averaging will tend to reduce the noise component of such a signal toward zero. However, note that boxcar filtering is not applicable to digital data demodulation since with the boxcar technique averaging must be done over many symbols and the exact period of the signal to be averaged must be known.

The present invention is directed to a system including a technique and implementing apparatus which do not experience the aforementioned disadvantages of either the conventional bandwidth switching technique or boxcar filtering technique.

SUMMARY OF THE INVENTION

An object of the invention is to reduce the predetection noise bandwidth of a modulated communication signal.

Another object of the invention is to reduce predetection noise bandwidth without expensive and cumbersome equipment.

Another object of the invention is to reduce the rate at which samples need be handled in subsequent processing.

A still further object of the invention is to reduce predetection noise bandwidth using averaging over a single data symbol and without prior determination of the exact signal period.

It is also an object of the invention to utilize the pre-detection averaging of the invention to form a data filter thus combining the function of noise bandwidth reduction and data shaping in a single unit.

Another object of the present invention is to provide a pre-averager circuit, particularly suited for digital signal processing (DSP) techniques, for programmably reducing the incoming noise bandwidth of a receiver when it is operated over a broad range of potential signal bandwidths.

Still another object of the present invention is to provide a pre-averager circuit having improved operational response in a tightly packed adjacent channel environment.

These and other objects as will become apparent are achieved by the invention described herein with reference to the following description of the preferred embodiments. According to the invention, a pre-averager is positioned in a receiver front end for processing the input signal. Assuming the information signal to be digital data, averaging of the samples will be over a single symbol. While the invention is not limited to digital data transmission systems, for convenience it will be described hereinafter in connection with such a system since the pre-averager according to the invention may be configured as a data filter for data detection. However, the pre-averager of the invention may also be used in receivers for other types of information signals such as video, speech and music.

The pre-averager of the invention includes a digital averaging module which samples an incoming signal, converted to baseband, at least at twice the noise bandwidth determined by the single, input IF filter. The samples are averaged over a defined averaging interval, ordinarily set as a function of the input data rate, and are then clocked out of the averager at a lower output data rate. An output sampling rate of two samples per symbol has been found acceptable in the preferred embodiment hereinafter described for noise bandwidth reduction, although other output rates may also be acceptable. When implemented as a data filter, the output rate will be reduced to one sample per symbol in the detection path as is also described hereinafter in detail. The defined averaging interval is the input sampling rate divided by the output sampling rate. The averaging technique implemented by the pre-averager of the invention permits averaging over a single symbol when used in a digital data transmission system and is not dependent on a prior knowledge of the exact signal period. It is also inexpensive and relatively simple to implement.

Significantly, the invention appears to conflict with well known sampling theory concepts in that the output sample rate of the pre-averager is typically lower than twice the input noise bandwidth, although it is never less than twice the input signal bandwidth. Further, groups of incoming samples may be replaced by a single sample which is representative of their average value. While the output sample will be slightly contaminated with aperture distortion, this may be easily compensated for by transmit side equalization, for example.

In accordance with another embodiment of the invention, the pre-averager is configured to form a data filter. An optimum data filter in digital data transmission must have two fundamental attributes. One, its frequency response should be matched to the transmitted signal spectrum. Two, its combined transmission and reception impulse response should exhibit equally spaced zero crossings so that interference does not occur in the detection of adjacent symbols. Surprisingly, a data filter approaching the optimum conditions is realized by the pre-averager of the invention when the output sampling rate is reduced to one sample per symbol in the detection path.

The pre-averager implemented data filter for the detection of asynchronous data may be constructed as two parallel paths per I or Q data channel, each containing a pre-averager. By asynchronous, it is meant digital data for which the exact clock frequency and phase are unknown and must be recovered. The first of the two pre-averagers supplies an even sample used for data detection, carrier phase recovery and automatic gain control (AGC) estimation. The second of the two pre-averagers provides an odd sample used for clock recovery. Since averaging according to the teachings of the invention produces only one output sample per symbol in each of two paths, a feature of the invention is the reuse of input samples to provide the necessary samples for data detection and clock recovery.

According to yet another embodiment of the present invention, the pre-averager implemented data filter for the detection of asynchronous data may be constructed as two parallel paths, each containing a pair of pre-averagers. Each of the pre-averagers in a corresponding path accumulates and performs a weighted average of digital samples over a period equal to twice the symbol interval. The pair of pre-averagers is coupled to a multiplexer circuit, which in response to clock signals based on the sampling rate, interlaces the average values produced in each pre-averager to produce an output signal at a rate of one sample per symbol interval. According to one aspect of the present invention, accumulating samples over two symbol intervals improves the data filter performance when the desires signal is located in a tightly packed adjacent channel environment.

The pre-averager according to this latter embodiment may include circuitry for weighting the samples based on finite impulse response (FIR) coefficients stored, for example, in random access memory coupled to the weighting circuitry. According to this aspect of the present invention, the response of the pre-averager may be optimized by changing the filter coefficients stored in memory.

In all cases, the pre-averager performs the function of rate reduction, that is, it reduces the rate at which subsequent circuits must operate in processing the data to a new, lower, fixed, rate. This reduces the complexity and expense of those circuits.

DETAILED DESCRIPTION OF THE PREFERRED EMBODIMENTS

According to a first embodiment of the invention an IF filter and a predetection digital averaging module effect noise bandwidth and rate reduction. Noise bandwidth reduction according to this invention could take place at baseband, carrier, or IF frequencies. However, it is convenient to initiate the noise bandwidth reduction at baseband and therefore, a preferred embodiment of the invention has the pre-averaging according to the invention initiated there. Also, as previously stated herein, noise bandwidth reduction may be accomplished for video, speech, music or other signals besides data signals. Because the present invention is especially useful in data transmission systems, the preferred embodiment is disclosed in relation to a data transmission system. In systems other than data transmission systems, variable rate reduction might be used to narrow the signal bandwidth in response to varying noise conditions.

Figure 1:
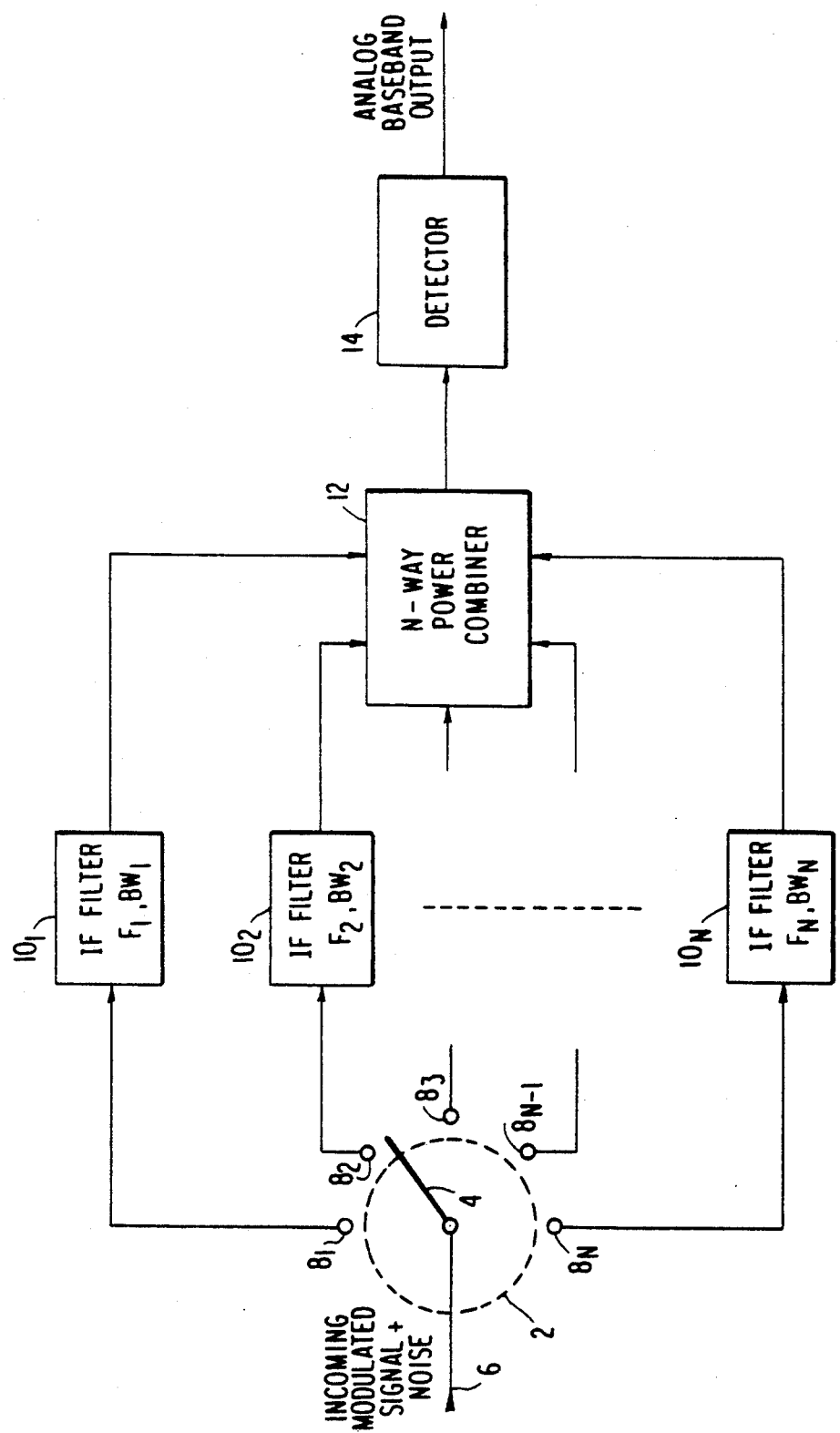
FIG. 1 illustrates a conventional bandwidth switching arrangement for reducing predetection noise bandwidth in a variable rate data receiver.
Figure 2:
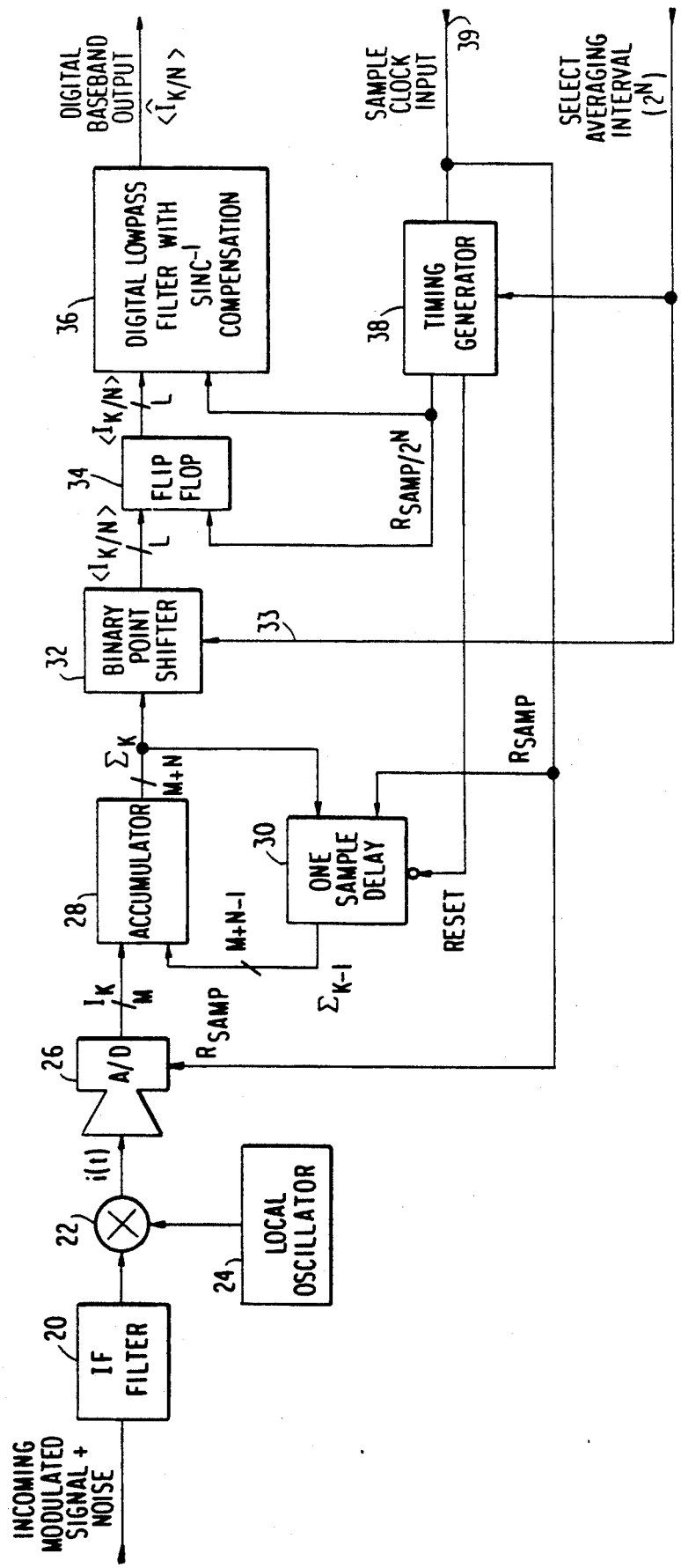
FIG. 2 illustrates a predetection noise bandwidth reducing pre-averager according to a first embodiment of the invention.

Referring to FIG. 2 a preferred embodiment of the pre-averager apparatus for noise bandwidth reduction includes an IF filter 20 passing the carrier modulated information signals and noise. The output from the IF filter is connected to a first input of a mixer 22. A second input to the mixer 22 is connected to local oscillator 24 for converting the IF signal to baseband. The output from mixer 22 is an analog baseband signal i(t) which includes noise whose frequency spectrum is limited by the bandwidth of IF filter 20. The signal i(t) is input to analog-digital (A/D) converter 26 which converts signal i(t) including its noise components to digital form. The input sampling rate $R_{SAMP}$ is relatively high to prevent aliasing of noise. Typically, the input sampling rate would be at or greater than twice the noise bandwidth of the IF filter 20. The sampling rate $R_{SAMP}$ for the A/D conversion is set by a clock signal generated by a sample clock (not shown) input at terminal 39.

The output $I_k$ from the A/D converter 26 is applied to an accumulator 28, where it is added to the value, $\Sigma_k$, output from the accumulator in response to the preceding sample $I_{k-1}$. This accumulated value is fed back from the accumulator output to a second input thereto, through a one sample delay 30. The one sample delay 30 may be a latch circuit. It is to be understood that the output from A/D converter 26 is a parallel arrangement of M bits.

The delay 30 is reset by a reset pulse from a timing generator 38. The reset pulse determines the averaging interval as it sets to zero the second input to the accumulator 26 at the end of the averaging interval. The averaging interval is conveniently set to a power of two ($2^N$). An averaging interval of $2^N$ causes the accumulator output to have a bit width of M+N. Since the magnitude of the accumulator output increases by N bits as the averaging interval increases in steps of $2^N$, a binary point shifter 32 is used to select the L most significant bits where L typically=M, thereby effecting a division by N, the result then representing the average $<I_{k/N}>$ of the digital inputs $I_k$ to the accumulator over the averaging interval. The averaging interval information is input to the binary point shifter 32 at a second input thereto connected to line 33.

A latching circuit 34 receives the L bits from the binary point shifter. The latching circuit functions as a buffer to assure the presence of all L bits representing the average $<I_{k/N}>$ for further processing. The latching circuit, which may be comprised of L parallel flip flops, is clocked at the lower output sampling rate of $R_{SAMP}/2^N$. Significantly, according to the present invention, further processing of the information signal and particularly detection thereof by a suitable detector is at the lower $R_{SAMP}/2^N$ output sampling rate. FIG. 2 includes a digital lowpass filter 36 with $\text{sinc}^{-1}$ compensation. This conventional device is optional and used when further shaping of an averaged data signal is desirable.

Figure 3:
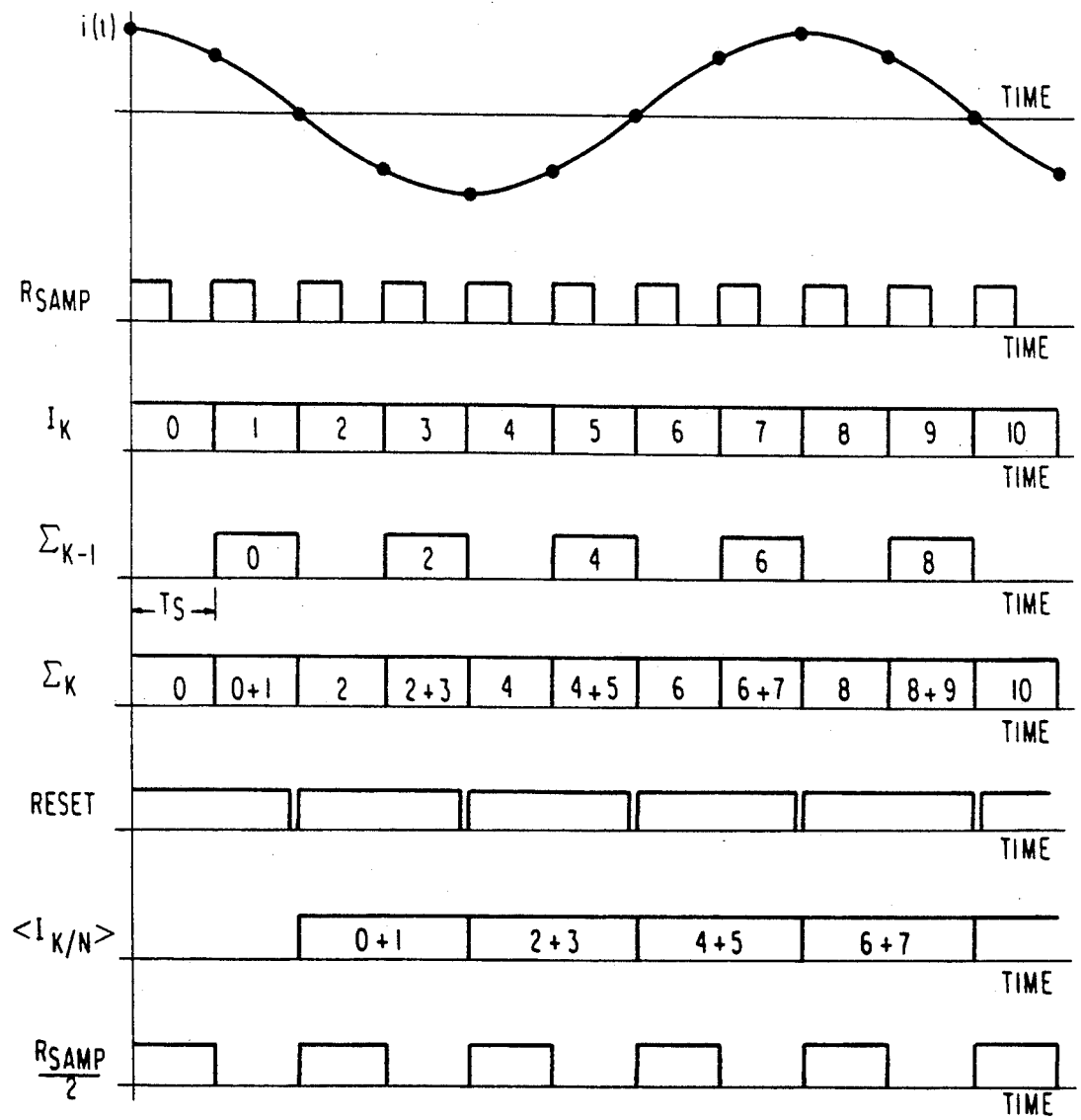
FIG. 3 is a timing diagram for illustrating the operation of the FIG. 2 circuit.

The operation of the embodiment of the invention depicted in FIG. 2 may best be understood when considered with the timing diagrams of FIG. 3, representing the timing of the various stages of the averaging performed by the FIG. 2 circuitry when N=1. The waveform i(t) represents an input signal at the mixer 22 output terminal. This signal is sampled at the rate $R_{SAMP}$ and converted to a digital signal in A/D converter 26. The output of the A/D converter $I_k$ is a stream of M bit-wide samples, designated in FIG. 3 by sample numbers 0, 1, 2, 3 . . . . That is, the first sample is designated, 0, the second sample, 1, and so forth. As N=1 in this example, the averaging interval is taken over two samples. Therefore, after the first sample, 0, passes through the accumulator, it is delayed by one sampling period, $T_S$, in the delay 30 as illustrated in the $\Sigma_{k-1}$ timing diagram where $T_S = 1/R_{SAMP}$. The delayed first sample coincides in time with the next sample, 1, as can be readily seen from the $I_k$ and $\Sigma_{k-1}$ diagrams. The first sample, 0, is added to the second sample 1 in accumulator 28 as illustrated in timing diagram, $\Sigma_k$, of FIG. 3. Since N=1, $R_{SAMP}/2^N = R_{SAMP}/2$ and therefore, a reset pulse is applied to the delay 30 after the second sample as shown in the Reset diagram of FIG. 3. The output from the delay 30 is thus zero when the third sample, 2, is input to the accumulator. The process continues as illustrated in FIG. 3, with every two samples being added and the delay 30 output being reset to zero after the sum is generated. At the conclusion of the first averaging interval, $1/R_{SAMP}/2$, the sum of the first and second samples passes through the binary point shifter, clocked at $R_{SAMP}/2$ in this example, to produce a signal representing the average value of the sum, $<I_{k/N}>$.

Figure 4:
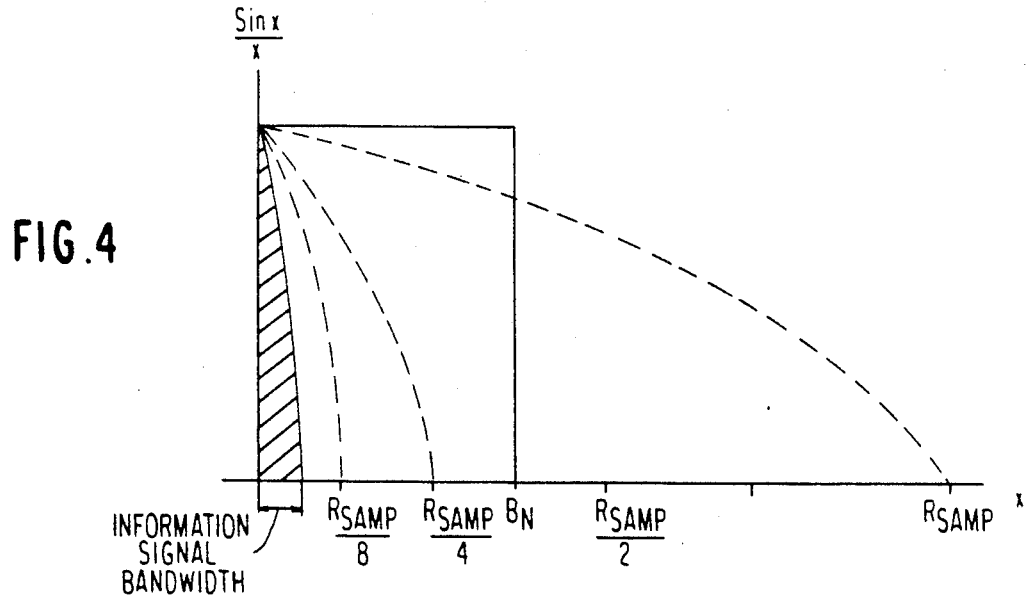
FIG. 4 is a general representation of the sin x/x versus x relationship for an input information signal and the overall signal bandwidth including noise at several sampling rates.

As illustrated in FIG. 3, averaging takes place within a single symbol, thus eliminating the prior art requirement for averaging over several symbols and the need to know the exact symbol period to accomplish the averaging process. Also, as the output sampling rate is lower than the input sampling rate the output bandwidth is narrowed to reduce the noise bandwidth prior to detection. This feature may be understood from FIG. 4 which represents the sin x/x versus x plot for various sampling rates, $R_{SAMP}/2^N$. The cross-hatched portion represents the information signal bandwidth. $B_N$ is the noise equivalent bandwidth of the IF filter. $R_{SAMP}$ in accordance with conventional sampling theory, is selected to be more than twice $B_N$. As the sampling rate $R_{SAMP}/2^N$ is reduced, the response of the pre-averager represented by the plot approaches the information signal bandwidth, simultaneously reducing the noise bandwidth. Thus, as described above, reducing the output sampling rate according to the teachings of this invention, by averaging the signal samples taken at $R_{SAMP}$, and clocking the averaged samples at the lower rate, $R_{SAMP}/2^N$, reduces the noise bandwidth.

Returning to FIG. 3 and particularly diagram $<I_{k/n}>$ a number of output samples ($0+1$, $2+3$, etc.), equal to one half the number of input samples of the input waveform, each output sample being an average of two input samples, are latched and then may be applied to digital lowpass filter 36 to produce a properly shaped digital baseband output, reduced in noise by the above described averaging process. Note that this filter will operate at a lower sample rate due to the preceding pre-averager and the rate reducing aspect of the invention. The noise reduced digital baseband output is applied to a suitable detector (not shown) for demodulation.

A second embodiment of the invention will now be discussed with reference to FIGS. 5, 6, and 7. In accordance with this further embodiment, the digital pre-averager described hereinabove is configured as a receive data filter, eliminating the need for a separate data filter following the pre-averager. As discussed previously herein, a data filter in a digital data transmission system should have two fundamental attributes. One, its frequency response should be matched to the transmitted signal spectrum. Two, its combined transmission and reception impulse response should exhibit equally spaced zero crossings so there is no inter-symbol interference at adjacent symbol detection points. As can be appreciated from a review of FIG. 4, the averaging and reduced sampling rate realized with the pre-averager of the invention provides a mechanism by which the frequency response can be substantially matched to the frequency spectrum of the transmitted signal. From FIG. 4 it is seen that as $2^N$ increases, the frequency spectrum of the averaged signal approaches that of the transmitted signal. According to a feature of this invention, a data filter is realized with the pre-averager disclosed herein when averaging occurs over a single symbol and the averaging is effected to produce one output sample per symbol in the detection path. With these criteria implemented by the pre-averager, the pre-averager output bandwidth closely approximates that of the transmitted signal. That is, when the pre-averager output is one sample per symbol, the sin x/x aperture response emulates the receive data filtering operation.

It is to be noted that the pre-averager data filter of the invention has a filter response slightly different from that of a conventional data filter. To compensate for the slightly changed shape of the filter response, predistortion, that is equalization, may be applied at the transmit end. Specifically, the transmit end equalization must compensate for a 0.9 dB excess loss at the Nyquist frequency and a softer overall response.

Figure 5:
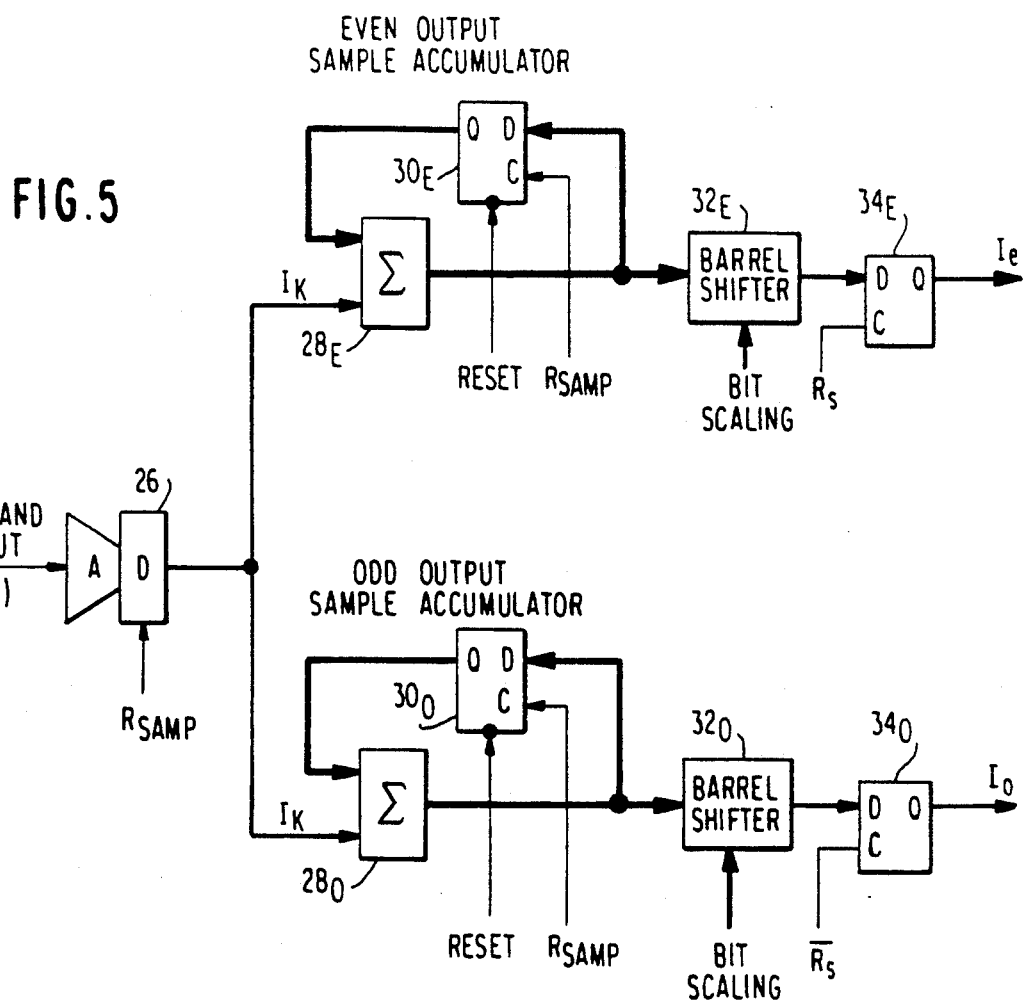
FIG. 5 illustrates a pre-averager data filter according to a second embodiment of the invention.

An embodiment of the data filter according to the second embodiment of the invention is illustrated in FIG. 5. In this arrangement, implemented to detect asynchronous data, the data filter includes two parallel paths. An even or detection sampling point path is for data detection, carrier phase recovery, and AGC estimation. An odd or zero crossing path is for clock recovery. Implementation of the data filter using parallel arranged pre-averagers includes at least the following two novel concepts. First, in averaging down to one sample per symbol and concomittently reducing the bandwidth to the range of a data filter, input samples must be reused. Second, the sampling points of the incoming data must be offset to provide properly centered samples to avoid attendant performance loss resulting from distortion in the averaged output.

Referring to FIG. 5, like elements in FIGS. 2 and 5 are identified by the same reference numeral, with duplications of an element in the same figure identified by subscripted reference numerals. The pre-averager data filter includes an A/D converter 26 receiving baseband signal i(t) and outputting the digitized samples, $I_k$, representing input signal, i(t). The digitized samples are simultaneously applied to the even output sample accumulator and odd output sample accumulator. The even output sample accumulator includes accumulator $28_E$ in the form a summing circuit, a one sample delay $30_E$ in the form of flip-flop circuits, a binary point shifter $32_E$ in the form of a barrel shifter, and latching circuit $34_E$ in the form of flip-flop circuits. The odd output sample accumulator is similarly constituted.

Operation of each of the parallel paths is the same as the operation of the circuitry of FIG. 3. However, to obtain the necessary output samples, $I_e$ and $I_o$, for data and clock recovery, sampling points are offset from the ideal sample points at the peaks and zero crossings and samples are reused. This concept of sample reuse will be discussed with reference to FIG. 6 which illustrates sample reuse together with the sampling point offset feature of the invention. The input symbols represent a 1/0 symbol pattern, with FIG. 6, for simplicity, illustrating two input samples per symbol which are to be averaged down to one output sample per symbol in each of the even and odd output paths.

Input samples are taken at offset sampling points a, b, C, d, and e. In the even output sample accumulator, samples b and c are averaged, as are samples d and e. The average A of samples b and c are shown superposed on an imaginary waveform labelled Even Outputs. It is of course understood that average sample A occurs after both samples b and c have occurred and thus the even and odd outputs do not have the phase relationship illustrated in FIG. 6. This figure simply depicts the sampling point offset and sample reuse features of the invention. The average sample B is an average of input samples d and e. Thus, the even path provides one output sample per symbol which uniquely defines the symbol value, 1 or 0.

For detection of asynchronous signals it is necessary to recover the signal clock. Clock recovery by use of the zero crossing samples is achieved using the odd outputs illustrated in FIG. 6. A first zero crossing at output average sample C is generated by averaging input samples a and b. It is to be noted that sample b is used both for the data detection path and the clock recovery path, thus the sample reuse feature of the invention may now be appreciated. A second zero crossing at output average sample D is generated by averaging input samples c and d. In this case, input sample d is reused for the same reason input sample b is reused. In fact, note that all samples are used twice.

It is to be understood that the invention is not limited to the case of only two input samples per symbol, nor is it limited to the use of two parallel paths, as discussed in greater detail below. In addition, at low data rates it is possible to generate both the data detection and clock recovery samples with a single, shared, hardware path or a microprocessor. In cases where clock recovery is unnecessary, only a single path corresponding to the even output sample accumulator path is required, as only data detection is necessary.

Operation of the pre-averager data filter will now be described in detail with reference to FIGS. 5 and 7. FIG. 7 is a timing diagram showing the operation of the even and odd accumulator paths where four samples per symbol are taken on the input signal i(t). This signal is a typical preamble with alternating 1/0 symbols. That is, in the FIG. 7 example, the input sampling rate $R_{SAMP}$ equals 4 samples per symbol while the output sampling rate $R_s$ equals 1 sample per symbol. $\overline{R}_s$ is the complement of $R_s$.

The digital samples $I_k$ represent the input signal values at points 1-4 of a first symbol, at points 5-8 of a second symbol and 9-12 of a third symbol. The timing of the four samples per symbol are illustrated in timing diagram E/O Acc Input as timing blocks 1-12. In the even path, samples 1, 1+2 and 1+2+3 are fed back to the summing circuit through delay $30_E$ as shown in timing diagram Even Acc Feedback In. The summing circuit sums samples 1, 2, 3, and 4 to produce a summed output as shown in timing diagram Even Acc. After the summing of samples 1-4, an even reset pulse sets the delay $30_E$ to zero to begin the summing process again, this time with samples 5-8. At the same time an output sample pulse $R_s$ rises to clock the summed samples 1-4, scaled in the binary point shifter $32_E$, to the parallel array of latching flip-flops represented by flip-flops $34_E$. The outputs from the latching flip-flops is the signal $I_E$ representing the data value for the symbol corresponding to samples 1-4.

The odd path operates in the manner of the even path except that as a result of the timing differences between $R_s$ and $\overline{R}_s$, and the even reset, Reset, and odd reset, Reset', different input samples are averaged. The odd path, like the even path, receives the samples 1-12. By reason of the timing of the odd reset, Reset', the odd accumulator feedback input receives samples (−2), (−1), and 1 which are summed with sample 2 before the delay $30_O$ is reset to zero by a Reset' pulse. Substantially simultaneously with the Reset' pulse, the output sampling pulse $\overline{R}_s$, rises to clock the sum of samples (−2), (−1), and 2 into latching circuits $34_O$ after being scaled by binary point shifter $32_O$. This process continues with samples 3-6, and then samples 7-10 as can be appreciated from FIG. 7. The odd path averages samples 3, 4 from a first symbol with samples 5, 6 of the next symbol so that the zero crossing sample between symbols is generated. Likewise, averaging of samples 7, 8 of the second symbol with samples 9, 10 of the third symbol generates the zero crossing sample between the second and third symbols.

Figure 6:
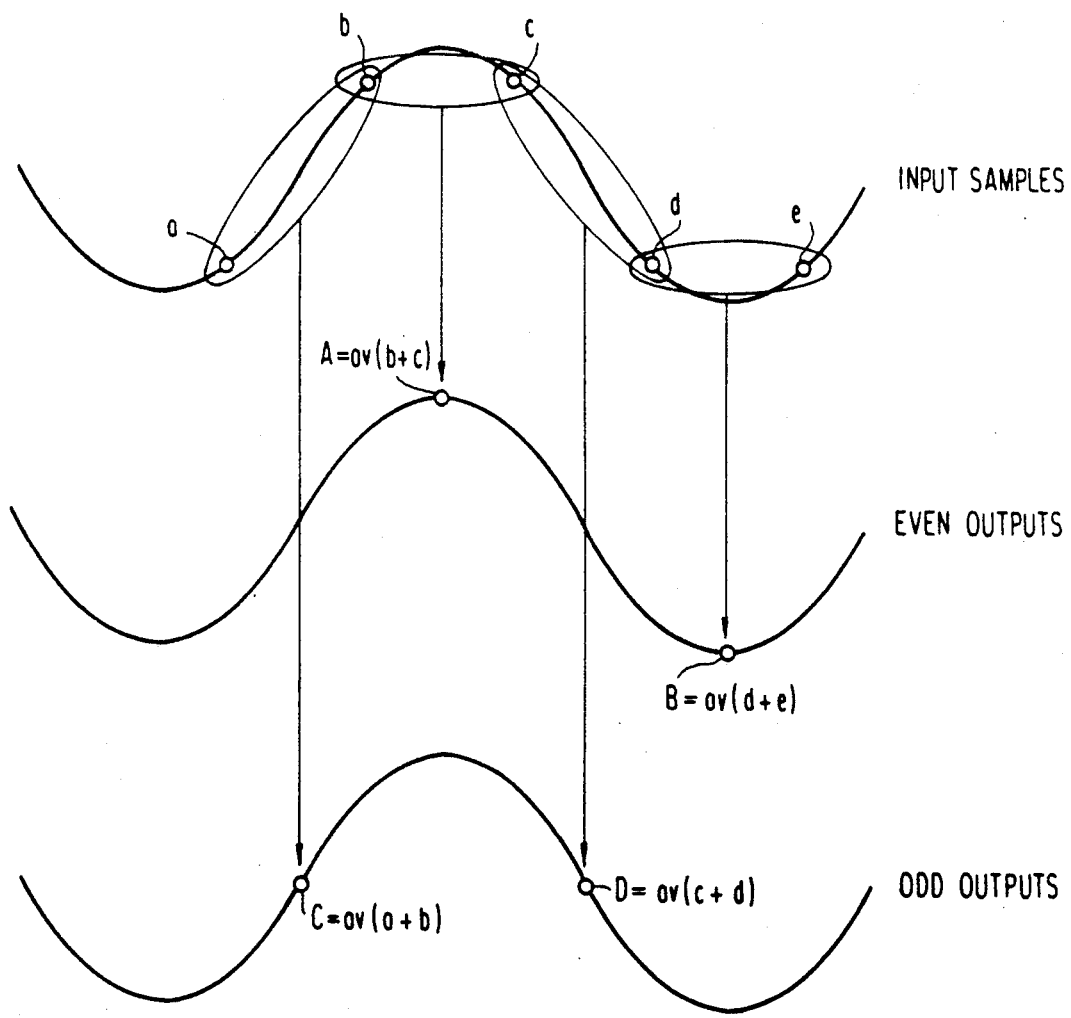
FIG. 6 is a representation of the sampling point offset and sample reuse features incorporated in the pre-averager data filter of FIG. 5.
Figure 7:
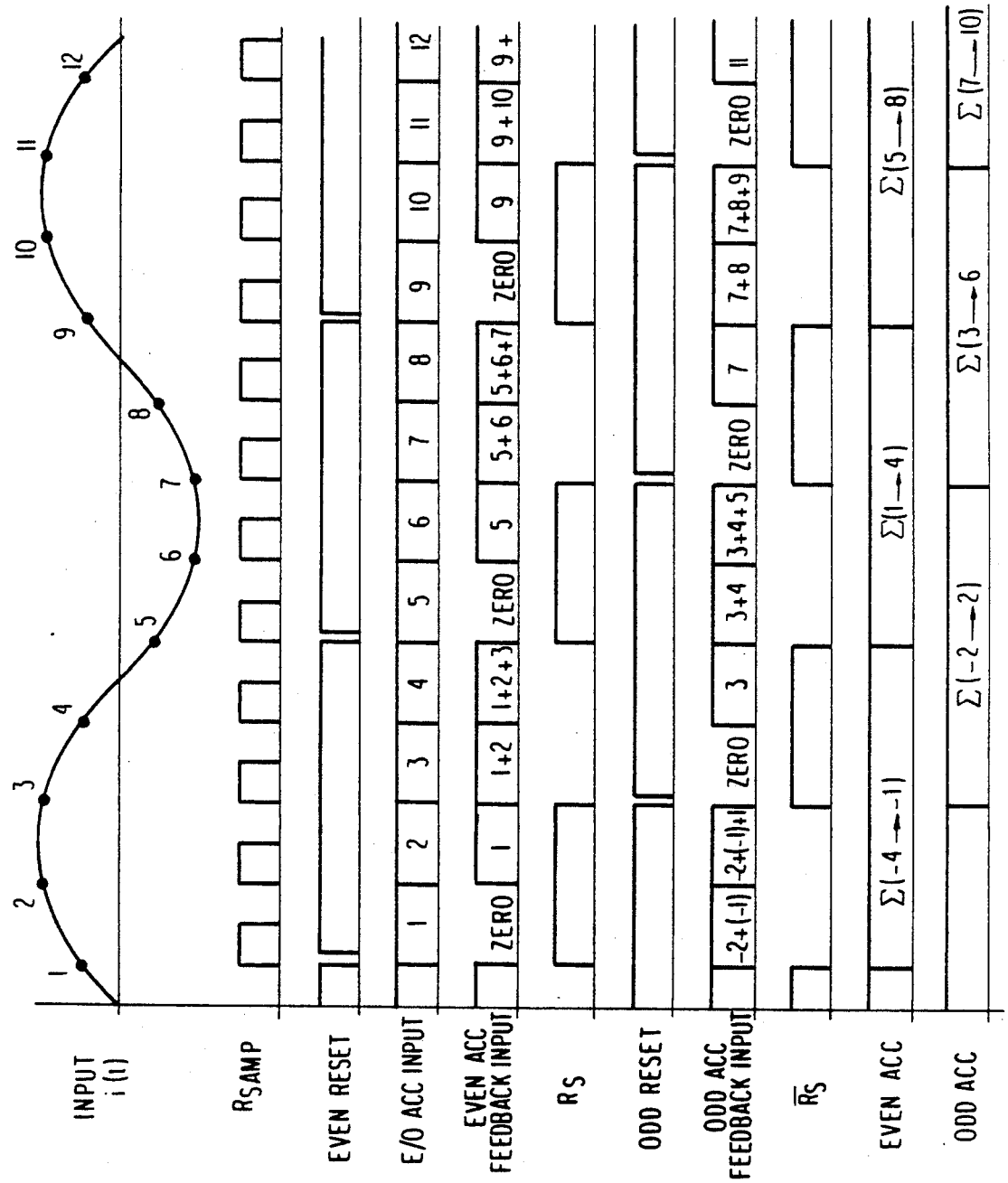
FIG. 7 is a timing diagram for illustrating the operation of the FIG. 5 circuitry.

The embodiment discussed with respect to FIGS. 5-7 advantageously provides an apparatus for performing bandwidth reduction, which is applicable for processing signals embedded in broadband noise. The bandwidth of the pre-averager advantageously can be set greater than or on the order of that of the incoming signal, such that the noise variance is reduced by the averaging factor while the signal is passed. It will be noted that when the pre-averager bandwidth is set nearly equal to the signal bandwidth, the pre-averager acts as the demodulator's receive detection filter. In the embodiment illustrated in FIG. 5, two parallel accumulators average digitally quantized samples coming from the output of A/D converter 26. That is, the average value of every N incoming samples is represented by an even and an odd sample whose repetition rate is 1/N times that of the input signal i(t). In digital data transmission, one of these streams of samples is processed for data detection, carrier phase recovery, and level control while the other stream is used for symbol timing recovery. Each stream advantageously has a rate of one sample/incoming data symbol.

While the embodiment of FIG. 5 has been demonstrated as being able to reduce the incoming noise bandwidth, this embodiment has been found to provide less than optimum performance in the presence of tightly packed adjacent channels. This degradation is apparently due to the relatively soft rolloff filtering characteristics of the circuit, which effectively has a time domain impulse response that is only one data symbol wide when a digital data stream is transmitted.

Another preferred embodiment of the present invention will now be described while referring to FIGS. 8-10. To better accommodate closely packed adjacent channel operation, two fundamental improvements have been incorporated in the embodiment illustrated in FIG. 8: 1) multiplying the input samples by a weighting function and 2) extending the length of the averaging interval from one to two symbols. Experimental results have demonstrated that inclusion of these two novel features advantageously improves rejection of the adjacent channel from about 13 to 33 dB. It will be appreciated that extending the averaging interval to 2 data symbols requires two parallel time-staggered pre-averagers to produce output samples at the required rate of 1 sample/symbol.

Figure 8:
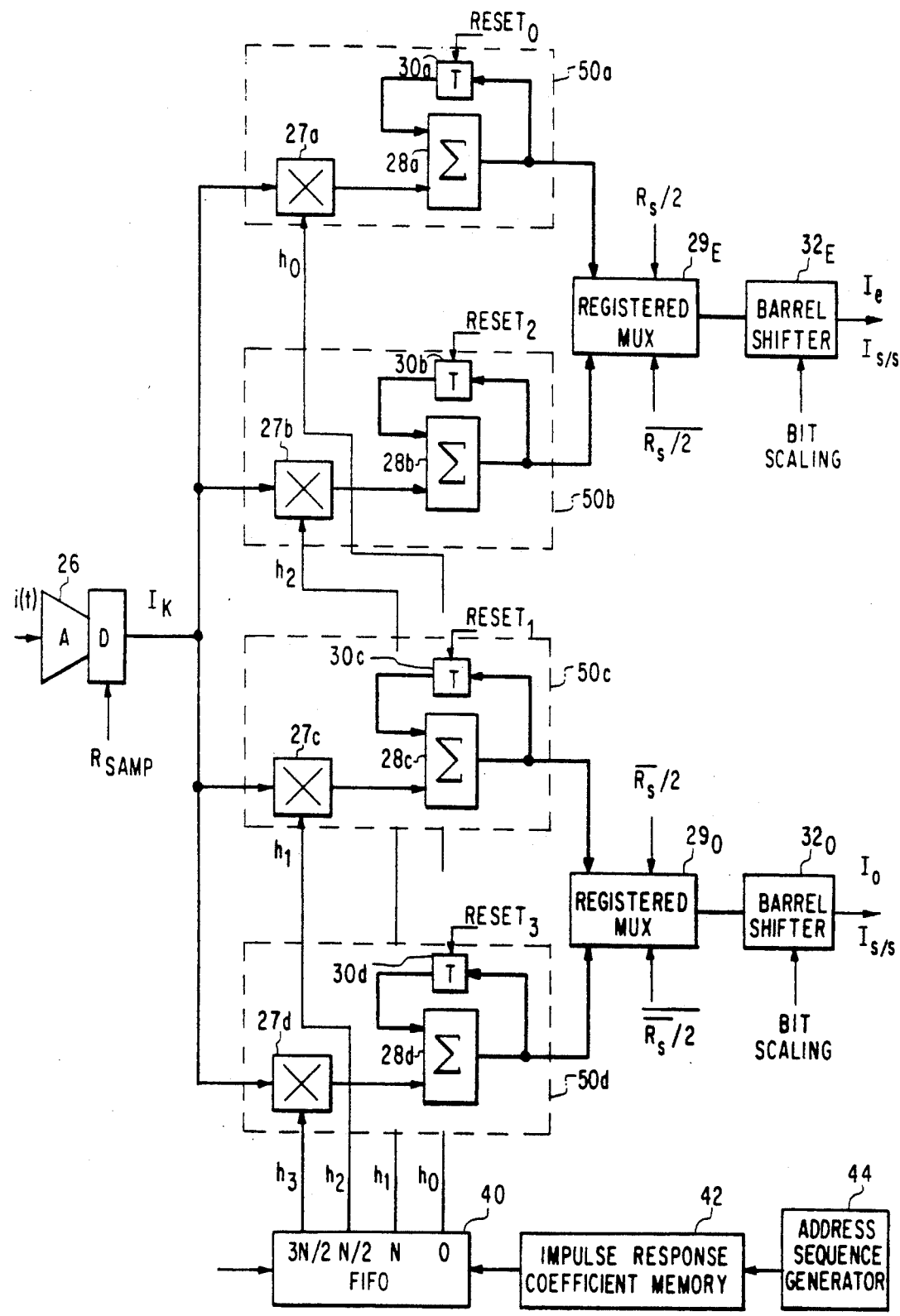
FIG. 8 illustrates a pre-averager data filter according to a another embodiment of the invention.

Referring to FIG. 8, another embodiment of the pre-averager circuit according to the present invention comprises an A/D converter 26 receiving an analog baseband signal i(t) and providing a digitized samples $I_k$ is operatively connected to odd and even binary point shifters, generally denoted 32, via two pairs of multiplier accumulators (MACs), generally denoted 50, and a pair of multiplexers, generally denoted 29. Preferably, each multiplexer 29 is operatively coupled to a corresponding pair of MACs 50 on its input side and to a corresponding shifter 32 on its output side. The output signals produced by the MACs 50 are advantageously combined to yield even and odd sample outputs $I_e$ and $I_o$. The output $I_e$ of $I_o$ of multiplexers $29_E$ or $29_O$, respectively, advantageously is an interlaced signal produced from the output of the pair of MACs 50 coupled to the corresponding multiplexer 29, as discussed in detail below.

Since each of the MACs 50 is constructed in an identical fashion, the construction of MAC $50a$ alone will be described. MAC $50a$ comprises a multiplier circuit, generally denoted 27, which is coupled to A/D converter 26 to receive digitized samples $I_k$, and which outputs a weighted $I_k$, discussed in greater detail below, to an accumulator circuit, generally denoted 28. The output of, for example, accumulator $28_a$, which corresponds to the output of MAC $50a$, is provided to both multiplexer $29_E$ and a one sample delay, generally denoted 30.

Each of the MACs 50 is connected to one output of a conventional first-in/first-out buffer circuit 40 receiving weighting factors from a memory 42 in response to a control signal provided by an address sequence generator 44. Those of ordinary skill in the art will recognize that buffer 40, memory 42 and generator 44 are conventional devices and will appreciate their use without further detailed description of these components.

Figure 9:
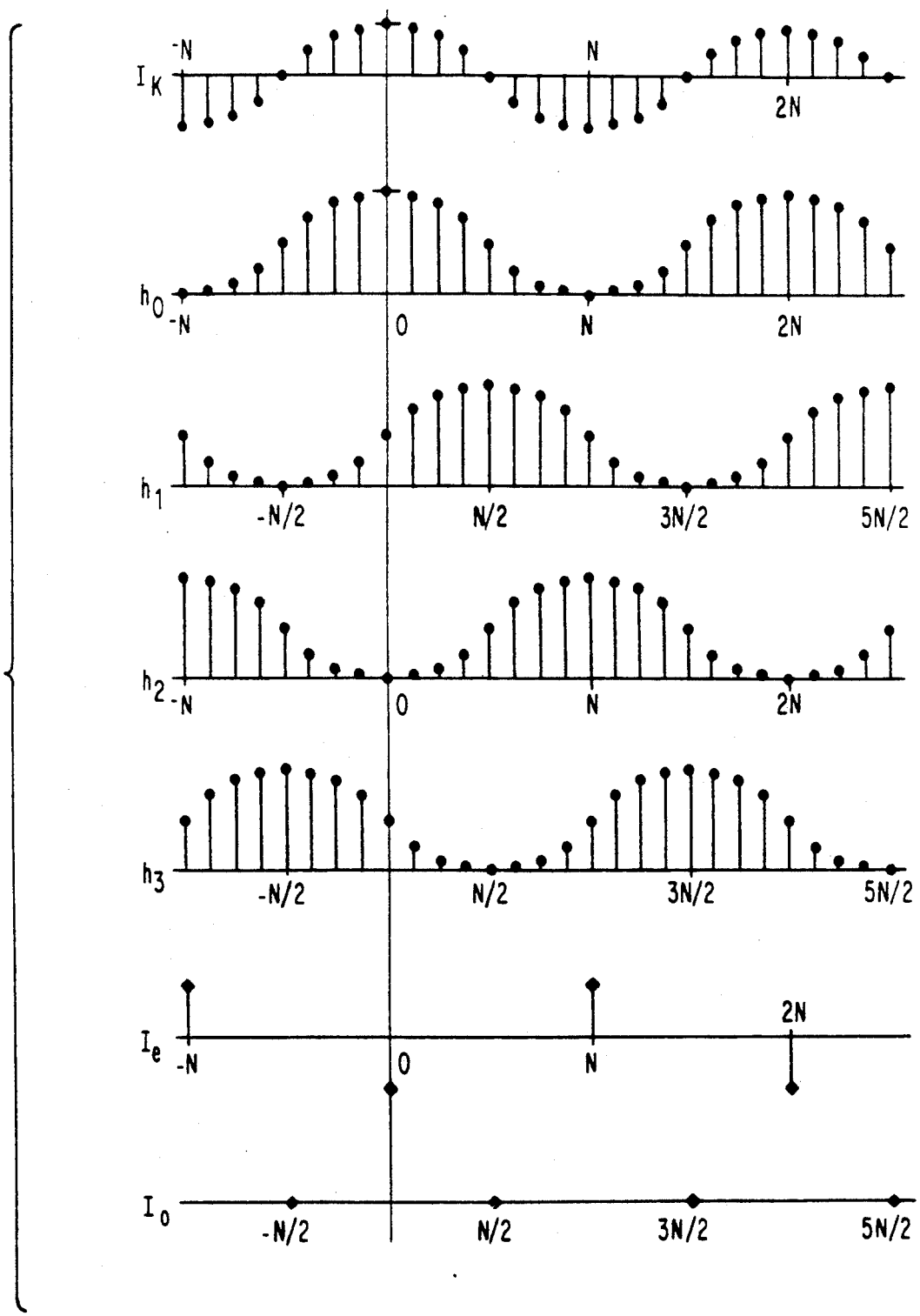
FIG. 9 is a representation of the time-staggered weighting factors incorporated in the pre-averager data filter of FIG. 8.
Figure 10:
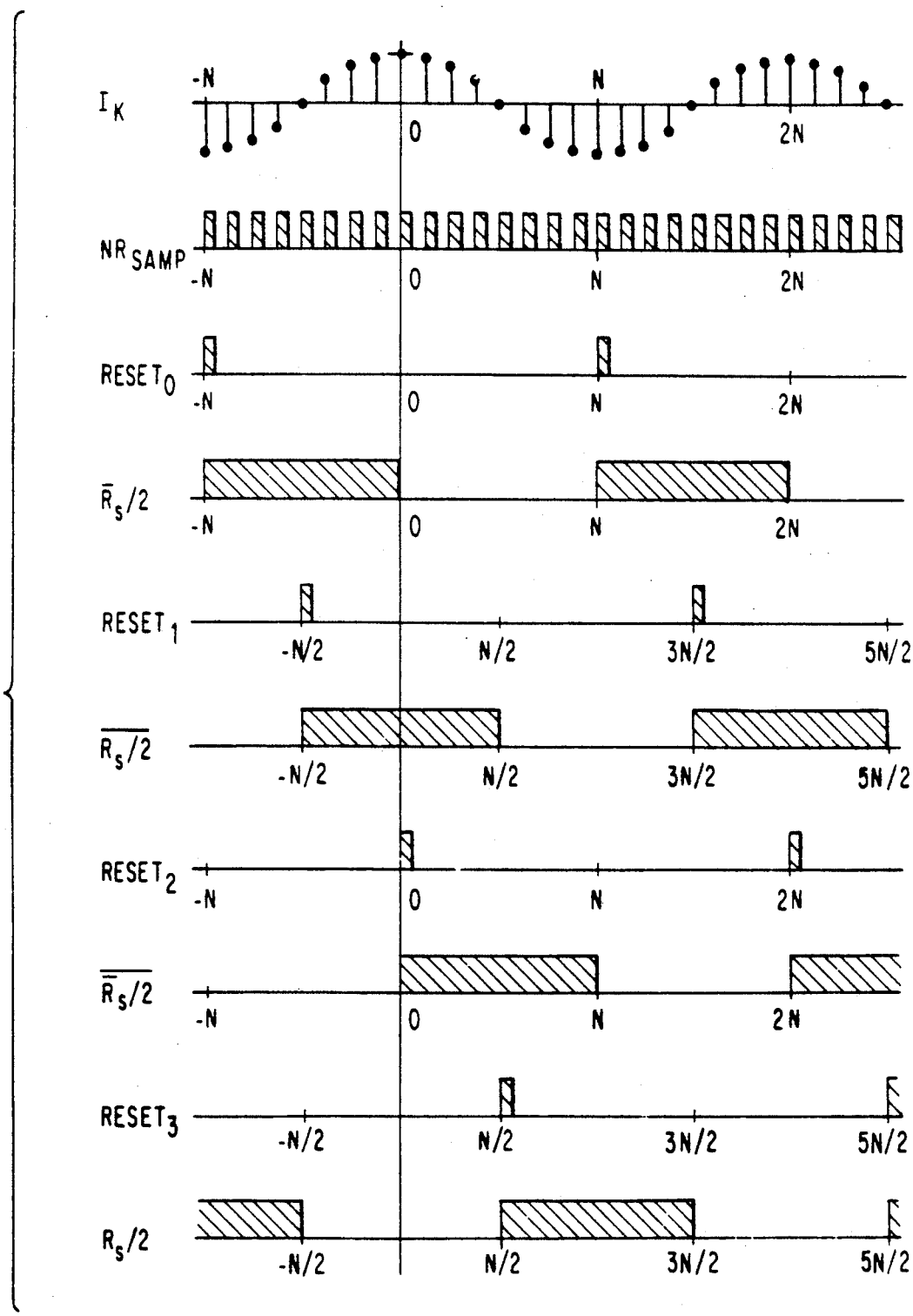
FIG. 10 is a timing diagram for illustrating the operation of the FIG. 8 circuitry.

The operation of the pre-average circuit illustrated in FIG. 8 can best be understood by referring to FIGS. 9 and 10. For the purposes of discussing these latter Figures, it is assumed that the input signal i(t) is a signal providing non-return-to-zero (NRZ) digital data transmission. Assume that the incoming signal i(t) is sinusoidal and is sampled at a rate N-times the data symbol rate (where $N \geq 2$), thereby producing the digitized samples $I_k$ shown in FIG. 9. These incoming samples are multiplied by samples corresponding to four time-staggered versions of the same impulse response weighting function, shown as $h_0$, $h_1$, $h_2$ and $h_3$ in FIG. 9. It will be noted that the signals $h_0$-$h_3$ in FIG. 9 illustrate time-staggered versions of a raised cosine impulse response function. Preferably, the samples of the raised cosine response are periodic over 2 symbols, and advantageously are staggered in half-symbol (N/2) increments. It will be appreciated from FIG. 8 that the samples $h_0$-$h_3$ are the weighting factors applied to MACs 50, thus providing each of the MACs 50 with an amplitude weighting factor.

From the discussion above, it will be apparent that the two MAC pairs must be interlaced as was shown in FIG. 8 to provide even and odd outputs at a one sample/symbol rate. Each output sample is then a weighted sum of contiguous groups of 2N input samples, where the accumulator 28 outputs are sampled and reset to zero after each input group of 2N samples is processed. For the case shown in FIG. 9, the timing is such that the interlaced even samples $I_e$ occur at their peak values, whereas the odd samples $I_o$ are zero. Preferably, the accumulators 28 are reset to zero in the time slot when their respective weighting coefficients are zero. In this situation, no multiplication is necessary.

The reset and interlace timing for the pre-averager circuit illustrated in FIG. 8 is shown in FIG. 10, in which the input digitized sample $I_k$ is again illustrated as a sinusoid and the sampling rate, $NR_{SAMP}$, is illustrated immediately below the $I_k$ curve. From the pre-averager circuit of FIG. 8 it will be appreciated that four reset signals, Reset$_0$-Reset$_3$, advantageously are provided for resetting delays 30 and each of these reset signals are shown in FIG. 10. As discussed above, each reset is conducted when the associated one of the weighting factors $h_0$-$h_3$ is zero, and, as can clearly seen from comparing FIGS. 9 and 10, each reset Reset$_0$-Reset$_3$ is applied when the corresponding weighting factor $h_0$-$h_3$ output by buffer 40 is zero.

As discussed above, the output from each of the multiplexers 29 provides an interlaced resultant signal, $I_e$ or $I_o$, from the weighted accumulated output signals produced by its corresponding pair of MACs 50. For example, the output of MAC 50a is interlaced with the output of MAC 50b by multiplexer 29$_E$ to provide the output signal $I_e$. It will be apparent from examination of FIGS. 8 and 10 that multiplexer 29$_E$ interlaces the outputs of MACs 50a and 50b in response to clock signals $R_s/2$ and $\overline{R_s/2}$, respectively, which are derived for a sample clock (not shown) operating at a rate $R_s$. Clock signals $R_s/2$ and $\overline{R_s/2}$, which are time-staggered to provide complementary sampling periods, are advantageously applied to multiplexer 29$_E$ it control the interlace function provided by that component. In other words, FIG. 10 illustrates that each accumulator 28 accumulates weighted digital signal samples over a period of 2N samples and that the output of each accumulator 29 is provided to the corresponding multiplexer 29 in response to the leading edge of a clock signal, generally denoted $R_s/2$. It will be apparent that the clock signal controlling the multiplexers 29 occurs immediately proceeding the corresponding reset pulse applied to the delays 30.

It will be noted that the MACs 50 advantageously perform four parallel time-staggered finite impulse response (FIR) filtering operations. It will also be apparent that the output sample rate of the even and odd MAC pairs has been decimated by 1 / N, so that only one averaged sample point from each filter convolution is available for further signal processing. Moreover, the pre-averager filter bandwidth will be on the order of half the symbol frequency, which is a direct result of the length of the accumulator 30's averaging interval. It will also be appreciated that the shifters 32 advantageously are provided to properly scale the most significant output bits, since the accumulator outputs will vary depending on the number of samples in the averaging interval.

It will be understood from the above discussion of the preferred embodiments of the present invention that the digital processing circuitry downstream of the A/D converter 26 advantageously can be implemented with a single digital signal processing (DSP) chip, which, in conventional configurations comprises a single MAC. In this situation, it will be apparent that the DSP chip would be reaccessed four times in order to provide the output signals $I_e$ and $I_o$ provided by the embodiment of the invention shown in FIG. 8. It will be further appreciated that reaccessing the DSP chip would reduce the maximum processing rate by a factor inversely proportional to the number of time the DSP chip is reaccessed.

From the improvements achieved between the embodiments illustrated in FIGS. 5 and 8, it will be apparent that improved filtering advantageously can be obtained by the addition of more parallel averaging paths while proportionally increasing the length of the averaging time interval. It will also be noted that the impulse response weighting function advantageously can be optimized for the particular application, for example, by changing the function stored in memory 42 in the embodiment illustrated in FIG. 8.

The invention has been described with reference to preferred embodiments. However, it is to be understood that the invention is not limited to the preferred embodiments. Various modifications apparent to those skilled in the art are within the scope of the invention which is limited only by the appended claims.

What is claimed is:

1. A pre-averager for reducing the noise band-width of a signal corresponding to transmitted digital data, said pre-averager comprising:

conversion means receiving an analog signal for generating digital signal samples corresponding to said analog signal at a first sampling rate;

processor means responsive to said digital signal samples and a predetermined weighting factor for accumulating the digital signal samples over a predetermined interval, said predetermined interval being at least twice a symbol interval of the signal to be detected, to produce a weighted accumulated sample for said digital signal samples occurring over said predetermined interval; and means, responsive to said weighted accumulated sample, for outputting said weighted accumulated sample at a second sampling rate.

2. A pre-averager for reducing the noise band-width of a signal corresponding to transmitted digital data, said pre-averager comprising:

conversion means receiving an analog signal for generating digital signal samples corresponding to said analog signal at a first sampling rate;

processor means responsive to said digital signal samples and a predetermined weighting factor for weighting and accumulating the digital signal samples over a predetermined interval, said predetermined interval being at least twice a symbol interval of the signal to be detected, to produce a weighted accumulated sample for said digital signal samples occurring over said predetermined interval; and means, responsive to said weighted accumulated sample, for outputting said weighted accumulated sample at a second sampling rate of one sample per said symbol interval.

3. The pre-averager of claim 2, further comprising:

storing means for storing said predetermined weighting factor; and output means for outputting said predetermined weighting factor to said processor means.

4. The pre-averager of claim 2, wherein said processor means comprises:

multiplier means for multiplying said digital signal samples by said predetermined weighting factor so as to produce weighted digital signal samples; and accumulator means for accumulating said weighted signal samples so as to permit outputting of said weighted accumulated samples.

5. The pre-averager of claim 4, wherein said processor means further comprises means for resetting said accumulator means at said predetermined interval responsive to a reset signal.

6. The pre-averager of claim 4, wherein said processor means further comprises means for resetting said accumulator means at said predetermined interval responsive to a reset signal and wherein said processor means generates a sample at said second sampling rate corresponding to an average of said weighted accumulated samples.

7. In a receiver for receiving a modulate signal which has a symbol interval which may be variable, apparatus for reducing the noise bandwidth of the modulated signal prior to signal detection, comprising:

conversion means receiving the analog modulated signal for generating a digital signal sample corresponding to the modulated signal at a first sampling rate;

a plurality of accumulators receiving said digital signal samples for accumulating values corresponding to said digital signal samples over a predetermined interval of at least two symbol intervals of a signal to be detected so as to produce a plurality of accumulated samples representing a sum of said digital signal samples over said predetermined interval; and means, responsive to said accumulated samples for interlacing said accumulated samples so as to provide an output signal corresponding to said accumulated samples at a second sampling rate slower than said first sampling rate.

8. The receiver of claim 7, wherein said accumulated samples are weighted accumulated samples and wherein said receiver further comprises:

a plurality of multipliers, each of said multipliers being operatively coupled between said conversion means and a corresponding one of said accumulators for providing a weighted digital signal sample to said corresponding one of said accumulators; and means for supplying a weighting factor to each of said multipliers.

9. The receiver of claim 7, wherein said means for interlacing is operatively coupled to at least two of said accumulators and wherein said means for interlacing is responsive to a plurality of clock signals so as to permit said means for interlacing to output selected ones of said accumulated samples at said second sampling rate, each of said selected ones of said accumulated samples being staggered in time with respect to the others of said selected ones of said accumulated samples.

10. A pre-averager for reducing the noise bandwidth of a signal corresponding to transmitted digital data, said pre-averager comprising:

conversion means receiving an analog signal for generating digital signal samples corresponding to said analog signal at a first sampling rate;

first and second multipliers operatively coupled to said conversion means for generating first and second weighted digital signal samples responsive to first and second weighting factors, respectively, said first weighting factor being time-staggered with respect to said second weighting factor;

first and second accumulators operatively coupled to corresponding ones of said first and second multipliers, for accumulating said first and second weighted digital signal samples, respectively, over a predetermined interval, said predetermined interval being at least twice a symbol interval of the signal to be detected, for generating first and second weighted accumulated samples;

first and second reset circuits, each of said reset circuits having an input and an output operatively coupled to a corresponding one of said first and second accumulators and receiving a corresponding one of first and second reset signals so as to permit said first and second reset circuits to reset a corresponding one of said first and second accumulators when a corresponding one of said first and second weighting factors is equal to a predetermined minimum value;

interlacing means operatively coupled to said first and second accumulators and receiving said first and second weighted accumulated samples and first and second clock signals, said interlacing means outputting said first and second weighted accumulated samples at a second sampling rate of one sample per said symbol interval responsive to said first and second clock signals;

wherein said first and second clock signals are time-staggered with respect to one another and wherein said first and second weighted accumulated samples are time-staggered responsive to said first and second clock signals.

11. A method of data filtering an analog signal corresponding to transmitted digital data having a symbol interval which may be variable comprising the steps of:

generating a plurality of digital signal samples responsive to said analog signal at a first sampling rate based on the bandwidth of said analog signal;

weighting said digital signal samples so as to produce weighted digital signal samples;

accumulating said weighted digital signal samples over a predetermined interval of at least two symbol intervals responsive to a plurality of clock signals so as to produce a plurality of weighted accumulated samples, each of said weighted accumulated samples being time-staggered with respect to the others of said weighted accumulated samples; and outputting an average value corresponding to a selected one of said weighted accumulated samples in response to a plurality of second clock signals so as to provide an output signal corresponding to said analog signal at a second rate corresponding to one sample per said symbol interval.

* * * * *